Aug. 25, 1964 E. E. MUNK 3,146,285
METHOD FOR PRODUCING PRESSURE-MOLDED PARTICLE BOARD ARTICLES
Filed May 1, 1961 2 Sheets-Sheet 1

Inventor: Edmund E. Munk
By Dickey, Craig & Freudenberg
ATTORNEYS

Aug. 25, 1964   E. E. MUNK   3,146,285
METHOD FOR PRODUCING PRESSURE-MOLDED PARTICLE BOARD ARTICLES
Filed May 1, 1961   2 Sheets-Sheet 2

INVENTOR.
EDMUND E. MUNK
BY
Dicke & Craig
ATTORNEYS

United States Patent Office 3,146,285
Patented Aug. 25, 1964

3,146,285
METHOD FOR PRODUCING PRESSURE-MOLDED PARTICLE BOARD ARTICLES
Edmund E. Munk, Oberstenfeld, Kreis Ludwigsburg, Germany, assignor to Furnier- und Sperrholzwerk J. F. Werz, Jr., K.G. Werzalit-Pressholzwerk, Oberstenfeld, Oberstenfeld, Kreis Ludwigsburg, Germany
Filed May 1, 1961, Ser. No. 106,555
5 Claims. (Cl. 264—266)

The present invention relates to a method for producing pressure-molded articles of a material generally called "molded particle board" made by compressing a mixture of organic or inorganic fibrous materials with a suitable binder. More particularly, the invention relates to a method for producing such pressure-molded articles which are provided with angular portions in the form of projecting edges, corners, or recesses, for example, moldings, profiled bars, strips, fillets, and similar parts as used, for example, for window frames, or in the production of furniture, that is, of parts which have previously been made of wood, metal, plastic, or a combination of wood and metal.

If such parts are made of solid wood it has to be of a high grade, free of knots. This fact as well as the loss of material which accrues in the production of such parts renders them rather expensive. Furthermore, since solid wood is very hygroscopic, even if provided with a protective enamel coating, it always absorbs or gives up moisture and consequently swells, shrinks, and warps, so that even a protective coating will sever therefrom or crack.

If such parts are made of metal, they mostly oxidize. If they consist of metals which have less of a tendency to oxidize, for example, aluminum or alloys thereof, they have the disadvantage of being highly heat-conductive and of therefore having poor insulating properties. If such parts are used, for example, for making window frames, the difference between the room and outside temperatures results in a strong condensation of moisture from the air on the inside of the window. It is also rather difficult to work with such metal parts and to secure any kind of fitting thereon. Furthermore, any metals, even light metals, are relatively expensive and it is impossible to coat them homogeneously with a plastic or with wooden veneers.

Profile strips, moldings, and the like of plastic have so far been made only of thermoplastics, and have been applied very seldom, for example, for window frames, because their dimensional stability under heat, for example, of the sun, is rather poor. Since such plastic is very expensive, profile strips and the like can be made economically only in the form of hollow profiles. Such hollow profiles can, however, be combined with other materials only with considerable difficulties, and it is especially difficult and expensive to mount any kind of fitting thereon. Also, profile strips and other articles of plastic will hold screw threads very poorly, and they are hard to secure by screwing or gluing, and veneers can be applied thereon only with difficulty. It is also a well-known fact that plastics have a poor resistance to aging since, after the plasticizer escapes therefrom, the material will become very brittle.

It is an object of the present invention to provide a new method for producing pressure-molded articles and parts of molded particle board, and especially articles of the type as described.

Another object of the invention is to produce such articles and parts which are provided with angular portions in the form of projecting edges or corners and recesses, and to make these articles and parts in a very simple manner and very inexpensively, of a very great solidity, and of a high resistance against various influences and thus, for example, absolutely weatherproof, insectproof, resistant to tropical conditions, or substantially noninflammable.

A further very important object of the invention is to reinforce the angular portions, such as projecting edges, corners, or recesses, of the molded articles and parts so as to have an even greater solidity and resistance to various stresses than other surface portions of the respective article.

Another object of the invention is to provide a method for covering the molded parts with a wooden veneer, a thin layer of plastic sheeting or other suitable material, and in a manner so that any sharp edges and corners of the core, that is, of the molded part itself, will also be made equally sharp in the covering.

The present invention is preferably carried out by first molding an intermediate blank of the respective article or part, for example, by filling a suitable mold with a mixture of organic or inorganic fibrous materials, for example, wood chips, excelsior, or other fibers, with a suitable binder, preferably synthetic resins which become adhesive when heated and are then also capable of hardening, and by then compressing the mixture by means of several dies in accordance with the number of surfaces at different levels on the part to be molded so that each surface will be compressed to a uniform degree of compression.

The premolded blank in which the plastic binder is still in an unset or only partly set condition is then, according to the present invention, inserted into another mold. In this mold which is heated the blank is further compressed to the intended final dimensions and heated to set and harden the plastic binder. In this operation especially the edge portions of the blank are additionally compressed. By subjecting the angular edges and corners to such additional pressure and heating, the synthetic resin binder will concentrate to a greater extent in these edge portions and the mixture of fibrous materials and binder when hardened will have at these parts of the finished produce an even greater solidity and toughness than at all other surface parts.

This result is attained according to the invention by providing the mold with an upper die and a lower die, at least one of which is movable toward the other, and by dividing the movable die or both movable dies into at least two parts, both of which are at first moved together toward the other die or die parts so as to compress the premolded blank to its general final degree of compression, whereupon at least one part of each movable die is further moved so as to further compress the most critical portions of the molded part, that is, especially the angular edges and corners thereof. For this purpose, each movable die is preferably divided along a line which substantially intersects with a corner of the blank which is to be reinforced.

The higher degree of concentration of synthetic resin binder at the most critical parts of the premolded blank which are to be reinforced according to the present invention may also be attained by applying a richer mixture of fibrous material and binder at these critical points when filling the first mold for producing the blank, or by additionally impregnating the normal mixture after being filled into the first mold at the critical points with the same or another kind of thermosetting binder, for example, by spraying, or by additionally applying a liquid thermosetting binder upon the outside of the premolded blank at the critical points thereof before inserting the blank into the finishing mold according to this invention.

Another feature of the present invention consists in covering the otherwise finished article with a wooden veneer or with a thin layer of plastic or other suitable material, for example, hard paper. Since the respective covering layer is very thin, this covering operation may be carried out in the same mold in which the core has been finished in the manner as above described. Depending upon its material and thickness, this covering layer may either be simply folded around and manually pressed flat against the core or it may be premolded in a separate operation to a shape equal to that of the core and then be applied around the core before it is reinserted into the mold, or the premolded covering layer may be placed in two sections into the upper and lower dies of the mold before the core is reinserted therein. By then repeating the compression operation by moving the separate parts of each die simultaneously toward the other die and to the final compressing position of all dies, the respective covering layer will be very tightly and permanently secured to the core, and the sharp corners of the latter will be equally sharp in the covering layer. If the covering layer consists of a wooden veneer the same may be extremely thin, and it may thus be applied at a low expense even though it may consist of a valuable type of wood. If the covering layer consists of plastic, it will be homogeneously combined with the core by the binder contained in the latter and also by being melted together with the core. The edges of the seam of the plastic covering which is preferably placed at an edge or corner of the core are thus also fused together so that the core will be covered completely. Such a plastic covering may be applied in different designs and colors, and it has the additional advantages of protecting the core absolutely from moisture and of making the outer surfaces of the molded part considerably harder and more resistant to various influences, for example, alcohol and heat, than has hitherto been possible by enamel or similar coatings.

Molded products of the kind with which the present invention is primarily concerned, that is, profiled bars, strips, fillets, moldings and the like do not only have to have hard and smooth outer surfaces with edge portions of a special solidity, that is, the features attained according to the present invention, but they must also be easily worked and applied, and very often they must be capable of withstanding various external influences. The material of which the products according to the invention are made, namely, molded particle board, that is, a compressed mixture of wood chips, excelsior or other fibrous material with a binder of thermoplastic synthetic resins, is ideal insofar as its workability and its adaptability to various conditions are concerned. The products made from it can be handled, sawed, drilled, and secured as easily as wood, and fittings of any kind may be easily screwed thereto. Entirely apart from any covering which may be easily applied thereto according to the invention either for appearance or for making the surfaces of these products more resistant, for example, against alcohol or heat, the raw materials of which these products are made may be widely varied and subjected to different treatments so as to comply with various conditions. Thus, either with or without an outer covering, the products accordinging to the invention may be made very resistant against various influences by subjecting their raw materials to various preliminary treatments, by applying synthetic resin binders of various kinds and at different mixing ratios to the fibrous materials so as to comply with particular conditions, or by adding suitable agents for attaining certain properties. Thus, for instance, for rendering the molded article weatherproof and resistant to tropical conditions, the binder to be applied to the fibrous materials may consist of weather-resistant and boilproof resins, for example, phenolic resins, and, in addition, the fibrous materials may also be made water-repellent by treating them, for example, with silicones. For rendering the molded articles insectproof, suitable wood preservatives, for example, naphthalene chloride, may be added to the raw materials, while for making them substantially noninflammable, ammonium phosphates, boric acid, or aminoplastics on a basis of urea or melamine may be added.

These are only a few of the multitude of properties with which the molded articles according to the invention may be provided, either by varying or treating its raw materials or by adding other substances thereto, or by treating them in their intermediate premolded condition or in the final treatment according to the present invention.

The apparatus for carrying out this final treatment according to the invention of finishing the premolded articles may be of many different designs in accordance with the size and shape of the particular articles to be produced. It is assumed that the foregoing description is so illustrative of the invention that a brief description of a single embodiment thereof, which is to be read with reference to the accompanying diagrammatic drawings, will suffice to elucidate the most essential features of the invention, the manner in which the inventive method may be executed, and the design and construction of the apparatus for carrying out this method.

In the drawings—

Figure 4:
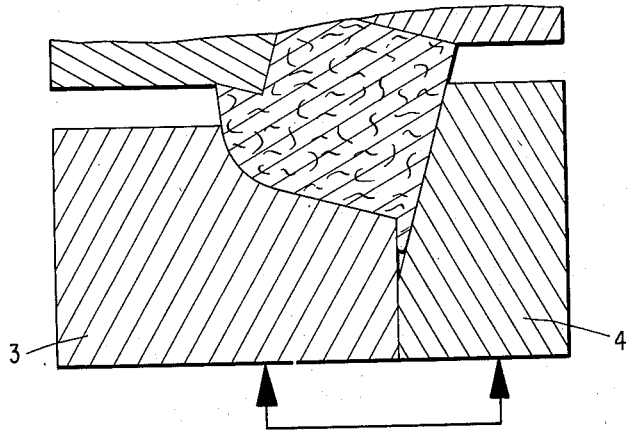
Figure 5:
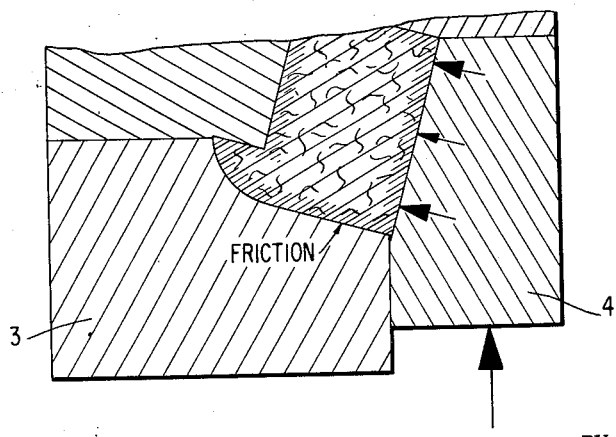

FIGURE 4 shows a similar cross section of the same mold wherein the mold portions are in an intermediate position in the form of the molded article; and FIGURE 5 shows a similar cross section of the same mold illustrating the final forming of the article within the mold and further illustrating the more highly concentrated areas of the article which result during the molding process according to the instant invention.

Figure 1:
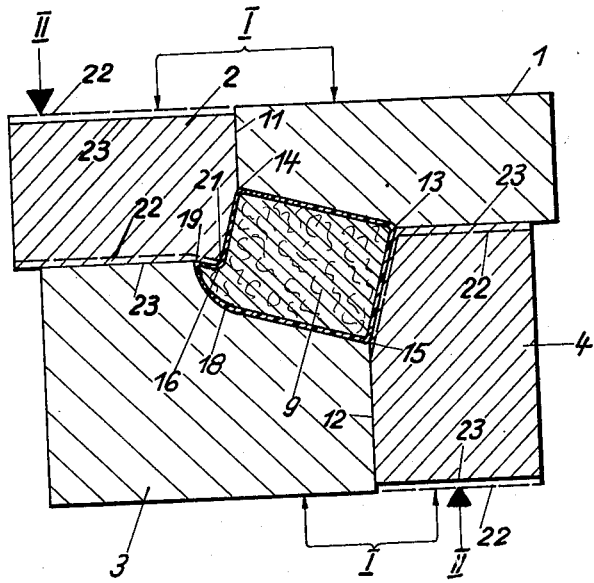
FIGURE 1 shows a diagrammatic cross section of a mold according to the invention in the closed position and with the finished molded article therein.
Figure 2:
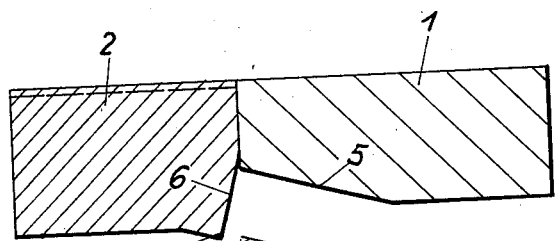
FIGURE 2 shows a similar cross section of the same mold in the open position with the premolded blank for producing the final article inserted therein to indicate the shape and dimensions of this blank relative to those of the several dies of the mold and of the final article.
Figure 2:
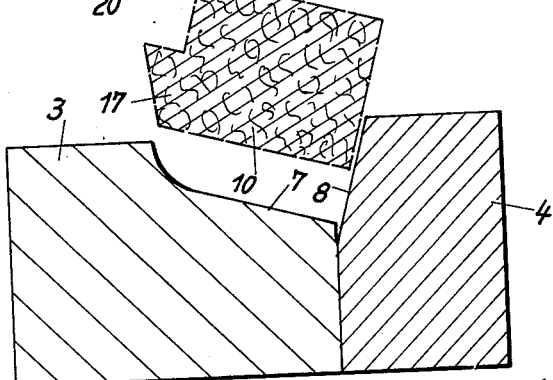

In the drawings, the mold according to the invention is shown as consisting of a pair of upper dies 1 and 2, and a pair of lower dies 3 and 4. These dies are provided with pressure surfaces 5, 6, 7, and 8, respectively, of a size and shape in accordance with the size and shape of the finished article 9. All of these pressure surfaces are preferably inclined relative to the direction of movement of the dies so as to exert an oblique thrust upon the surfaces of the blank 10 during the compression thereof. The upper die 1 and the lower die 3 which are disposed substantially diagonally to each other are to be mounted in a hydraulic press, not shown, and to be reciprocated between the open position, as shown in FIGURE 2, and the closed position as shown in FIGURE 1. The two other dies and 2 and 4 are likewise disposed substantially diagonally to each other and their lateral surfaces 11 and 12 are slidable along the corresponding surfaces of dies 1 and 3 so as to permit dies 2 and 4 to be moved independently of dies 2 and 3 to carry out a slightly longer compression stroke than dies 1 and 3.

In order to insure that the corners 13, 14, and 15 of the finished article 9 will be sharply angular and also of a great solidity, the lines of separation between the upper dies 1 and 2 and the lower dies 3 and 4, and also between dies 1 and 4 are disposed in positions so that, when the mold is fully closed and all dies are in engagement with each other, as shown in FIGURE 1, these lines intersect with and terminate at the corners 13, 14, and 15, respectively, of the finished article 9. In order to shape and reinforce the projection 16 of the final article, blank 10 is premolded so as to have a projecting wide-angular corner 17 at the point where in the finished article 9 in accordance with the shape of die 3 a rounded corner 18 is to be formed. Consequently, when the mold is being closed, the excess material of corner 17 of blank 10 up to the sharply angular edge 19 of the projection will be more strongly compressed than other parts of the blank as shown in FIGURE 5. Since the projection 16 is relatively thin and the upper die 2 is also provided with a downwardly jutting nose 20 in accordance with the sharply angular recess 21 in the finished article, the displacement of the material from the angular corner 17 of the blank will also result in a more solid compression of the entire projection 16 and thus also of the sharp corner of recess 21.

Figure 3:
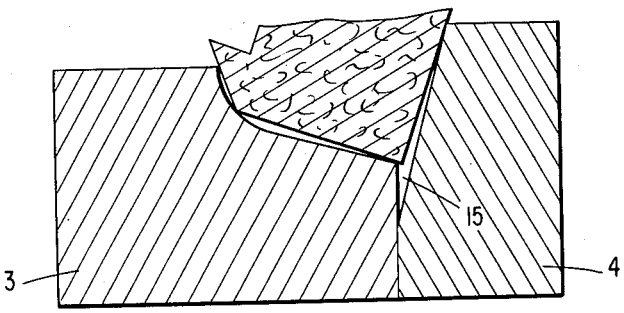
FIGURE 3 shows a similar cross section of the same mold with the partially pre-formed blank inserted into the mold portions.

During the first stage of the compression of the premolded blank 10, as indicated in FIGURE 1 by the arrows I, each set of dies or at least both upper dies 1 and 2 are moved simultaneously and for an equal distance from the open position of the mold, as shown in FIGURE 2, to a position where the dies meet the unformed blank, as shown in FIGURE 3, to the normal compression position, that is, to the position according to FIGURE 1 in which dies 1 and 3 are shown in full lines, while dies 2 and 4 are in the position as shown by the dotted lines 22. By this equal compression stroke of both sets of dies relative to each other, blank 10 is compressed to its final shape and nearly to its final dimensions as shown in FIGURE 4. Dies 1 and 3 are then stopped in this position. Thereupon, in the second compression stage, as indicated in FIGURE 1 by the arrows II, dies 2 and 4 are further moved for a small distance from the dotted-line position 22 to the full-line position 23. This additional movement as shown in FIGURE 5 has the effect that those parts of the otherwise finished article which might be more easily damaged than other parts, that is, particularly the sharply angular portions, will be subjected to an additional compression, whereby all corners 13, 14, 15, 19, and 21 will be reinforced and the molded article will be compressed to its final dimensions. By this final compression of the heated dies, the synthetic resin binder in the fibrous material will also be more highly concentrated in and adjacent to the critical edge portions, as indicated in FIGURE 5 by the darker portions. Due to this stronger compression and higher concentration of resin, these critical edge portions will, when the resin has hardened, be of a much greater solidity and toughness than all other portions of the finished article 9.

As previously pointed out, the concentration of synthetic resin at the critical edge portions of the finished product may be further increased by impregnating these portions additionally either when the loose mixture of fibrous materials and binders is filled into the mold in which blank 10 is formed or by applying additional resin in a liquid condition upon the edge portions of the blank, for example, by spraying. This additional resin may be of the same kind as that of the binder in the mixture of fibrous materials or it may be of another kind which is compatible with the binder but solidifies to a greater degree of hardness.

In the condition as above described, the finished article 9 may, after the synthetic resin has hardened completely, be removed from the mold and may then be applied for its intended use. Its outer surfaces will be completely smooth and, obviously, they may also be painted or enameled.

If, however, a thin covering 24 of sheet plastic, hard paper, or other suitable material, or a thin wooden veneer is to be applied upon the finally compressed article 9 which then forms a core, the same is removed from the mold before the binder has completely set. The respective covering 24, if sufficiently thin, is then either applied by hand to some or all of the surfaces of the core or of the pressure surfaces 5 to 8 of the dies, or such a covering may be applied in a premolded condition. If the entire article 9 is to be covered, the seam of the covering sheet is preferably placed directly upon the edge of one corner of the core so that the edges of the seam will in the subsequent compression of covering 24 be pressed tightly against each other. If the covering 24 consists of plastic or other meltable material, the edges of the seam will be fused together so that no seam will remain in the finished product.

As already indicated, after the covering 24 has been applied either upon pressure surfaces 5 to 8 of the dies or upon the surfaces of the core 9, and after the latter has been reinserted into the mold, the mold is again closed to its final position 23. Through this compression, and the adhesiveness of the resin on the surfaces of the core, as well as through the heat of the mold, the covering 24 will be permanently bonded at all points to the core or even be fused thereto. The edges of covering 24 will then be just as sharp as those of the core.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A method of producing pressure-molded articles, comprising the steps of filling a mold with a mixture of fibrous materials of at least one thermosetting binder of synthetic resin, and of at least one additional agent for increasing the resistance of the molded article against particular influences, compressing said mixture in said mold to form a blank of a shape substantially similar to the shape of the desired article but of larger dimensions, then removing said blank from said mold and inserting it into a second, heated mold, compressing said blank substantially uniformly in said second mold to substantially its final size and shape, and thereafter concentratingly the binder in said second mold more highly within the edges and corners of the blank by additionally compressing particularly the edges and corners of the blank in said second mold to the final size and shape thereof, and then allowing the blank to set and harden within said second mold.

2. A method of producing press-molded articles, comprising the steps of filling a mold with a mixture of fibrous materials and at least one thermosetting binder, compressing said mixture in said mold to form a blank of a shape similar to the shape of the desired article but of larger dimensions, then removing said blank from said mold and inserting it into a second, heated mold, compressing said blank in said second mold to a shape substantially equal to the shape of the desired article and some parts of said blank substantially to their final size and other parts including the edges and corners of the blank to a size slightly larger than their final size, then concentrating the binder more highly within said edges and corners by finally compressing said other parts in said second mold to their final position, and then allowing the blank to set and harden within said second mold.

3. A method of producing pressure-molded articles comprising the steps of filling a mold with a mixture of fibrous materials and at least one thermosetting binder, compressing said mixture in said mold to form a blank of a shape similar to the shape of the desired article but of larger dimensions, then removing said blank from said mold and inserting it into a second, heated mold having an upper and a lower die, at least one of said dies being divided into at least two parts, compressing said blank in said second mold to a shape substantially equal to the shape of the desired article by moving both of said die parts simultaneously and equally toward the other die, whereby some parts of said blank are compressed substantially to their final size and other parts including the edges and corners of the blank are compressed to a size slightly larger than their final size, then stopping the compression stroke of one of said die parts and thereafter concentrating the binder more highly within said edges and corners by further compressing the other die part so as to compress said other parts of said blank to their final size, and then allowing the blank to set and harden within said second mold.

4. A method of producing pressure-molded articles, comprising the steps of filling a mold with a mixture of fibrous materials and at least one thermosetting binder, compressing said mixture in said mold to form a blank of a shape similar to the shape of the desired article but of larger dimensions, then removing said blank from said mold and inserting it into a second, heated mold, compressing said blank in said second mold to a shape substantially equal to the shape of the desired article and some parts of said blank substantially to their final size and other parts including the edges and corners of the blank to a size slightly larger than their final size, then concentrating the binder more highly within said edges and corners by finally compressing said other parts in said second mold to their final size, then opening said second mold and applying a thin covering at least upon some parts of said blank, then closing said second mold and again compressing said blank with said covering thereon to the final size of the article, and then allowing the blank to set and harden within said second mold and thereby bonding said covering to said core.

5. A method of producing pressure-molded articles comprising the steps of filling a mold with a mixture of fibrous materials and at least one thermosetting binder, compressing said mixture in said mold to form a blank of a shape similar to the shape of the desired article but of larger dimensions, then removing said blank from said mold and inserting it into a second, heated mold, compressing said blank in said second mold to a shape substantially equal to the shape of the desired article and some parts of said blank substantially to their final size and other parts including the edges and corners of the blank to a size slightly larger than their final size, then concentrating the binder more highly within said edges and corners by finally compressing said other parts in said second mold to their final size, then opening said second mold and applying a thin covering of plastic sheeting entirely around said blank so that the opposite outer edges of said sheeting substantially meet at one edge of said core, then closing said second mold and again compressing said blank with said covering thereon to the final size of the article, whereby said outer edges of said sheeting will fuse together on said edge of said core, and then allowing the blank to set and harden within said second mold and thereby homogeneously combining said plastic covering with said core.

References Cited in the file of this patent
UNITED STATES PATENTS

| | | |
|---|---|---|
| 1,510,745 | Montgomery | Oct. 7, 1924 |
| 1,790,178 | Sutherland | Jan. 27, 1931 |
| 2,237,048 | Carter | Apr. 1, 1941 |
| 2,248,233 | Heritage | July 8, 1941 |
| 2,682,083 | Patton | June 29, 1954 |
| 2,740,990 | Miller et al. | Apr. 10, 1956 |
| 2,772,194 | Fisher et al. | Nov. 27, 1956 |
| 2,825,672 | Koblitz et al. | Mar. 4, 1958 |
| 2,851,730 | Wilhelmi et al. | Sept. 16, 1958 |
| 2,977,264 | Shapero et al. | Mar. 28, 1961 |
| 2,991,824 | Loechl | July 11, 1961 |

FOREIGN PATENTS

| | | |
|---|---|---|
| 521,181 | Italy | Mar. 25, 1955 |
| 536,948 | Italy | Dec. 12, 1955 |